Figure 1:
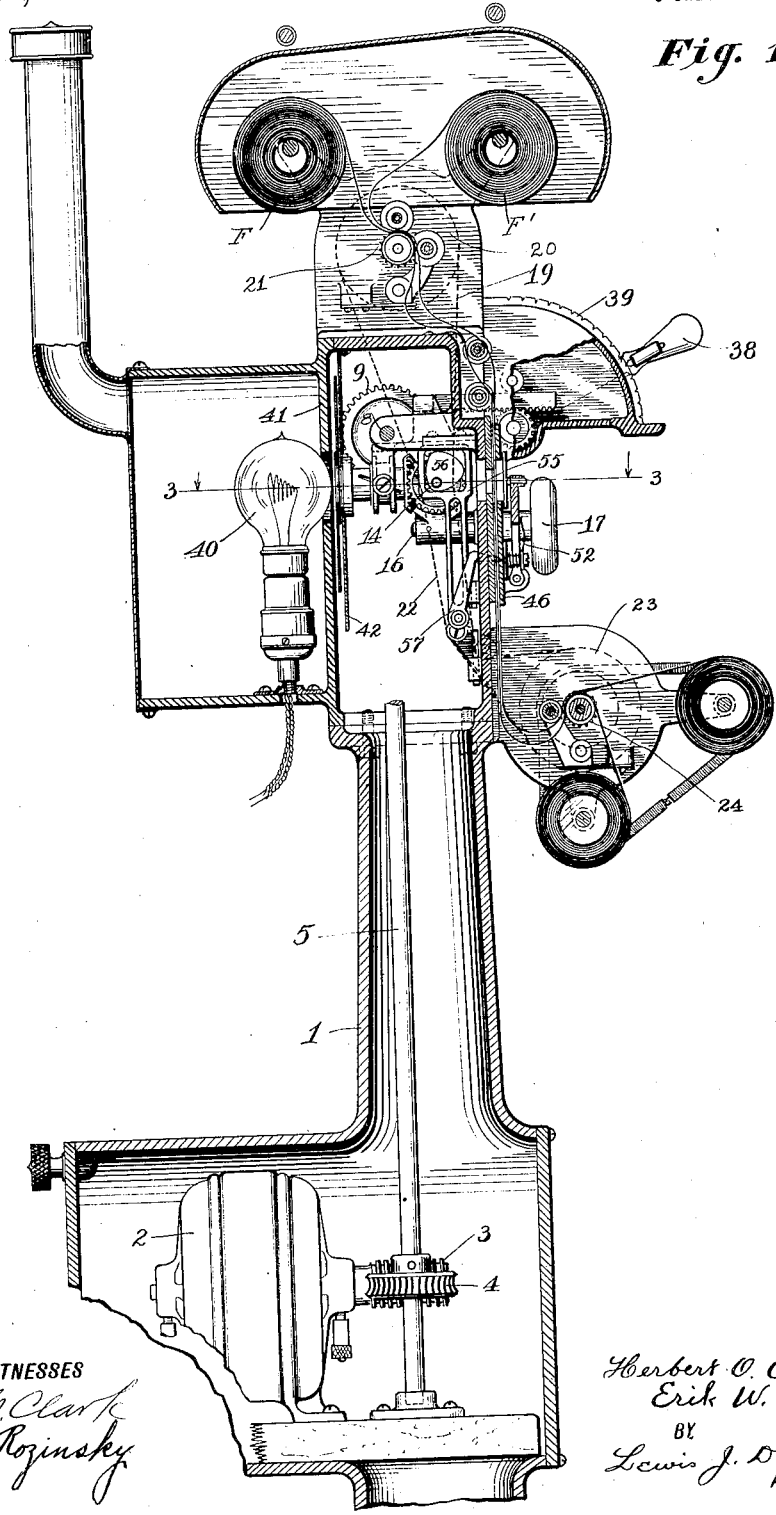

H. O. CARLETON & E. W. NELSON.
APPARATUS FOR PRINTING POSITIVE MOTION PICTURE FILMS.
APPLICATION FILED OCT. 23, 1913.

1,152,599.

Patented Sept. 7, 1915.
5 SHEETS—SHEET 2.

WITNESSES
R. G. Clark
A. Rginsky

INVENTORS
Herbert O. Carleton
Erik W. Nelson
BY
Lewis J. Doolittle
ATTORNEY

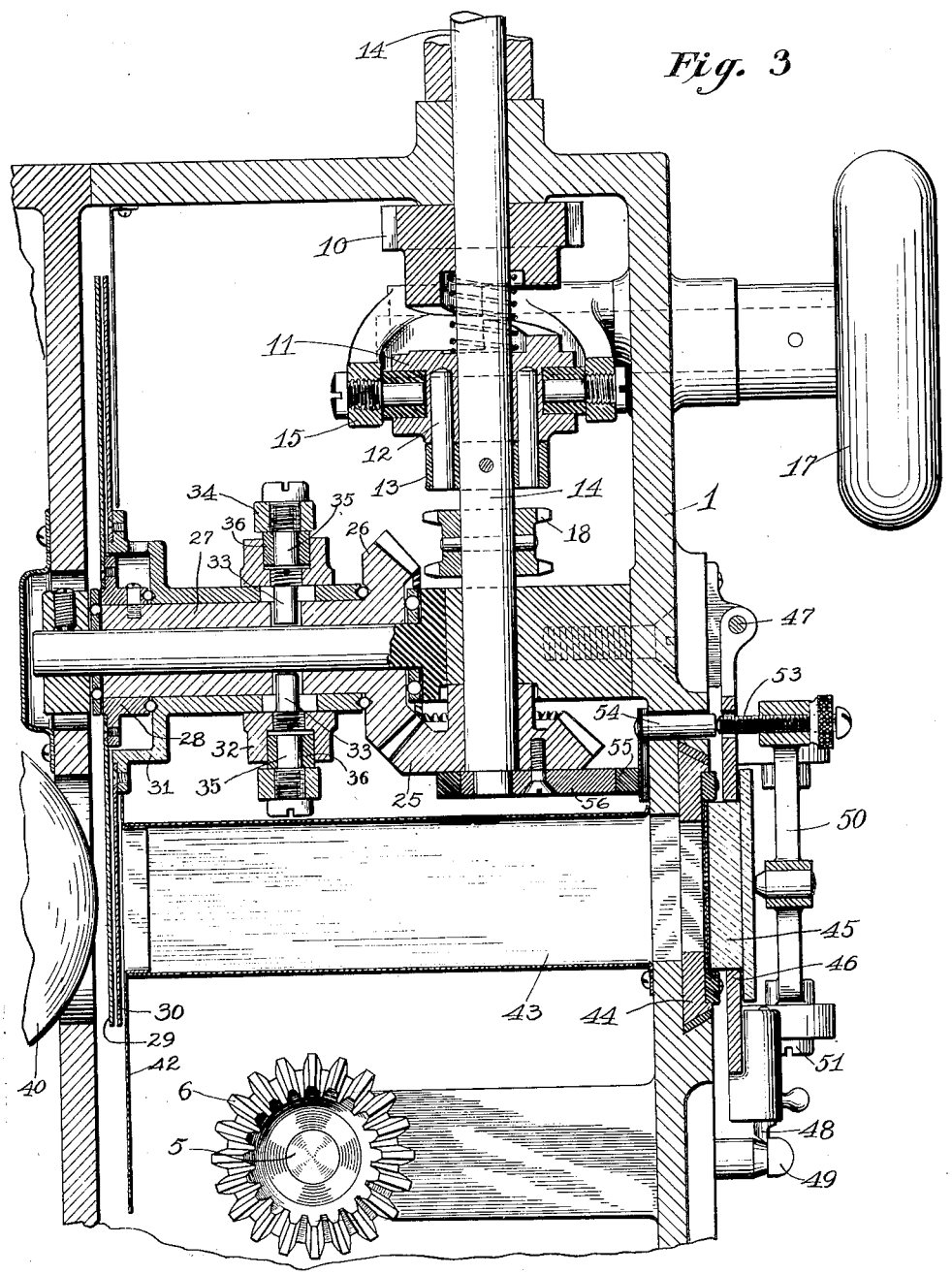

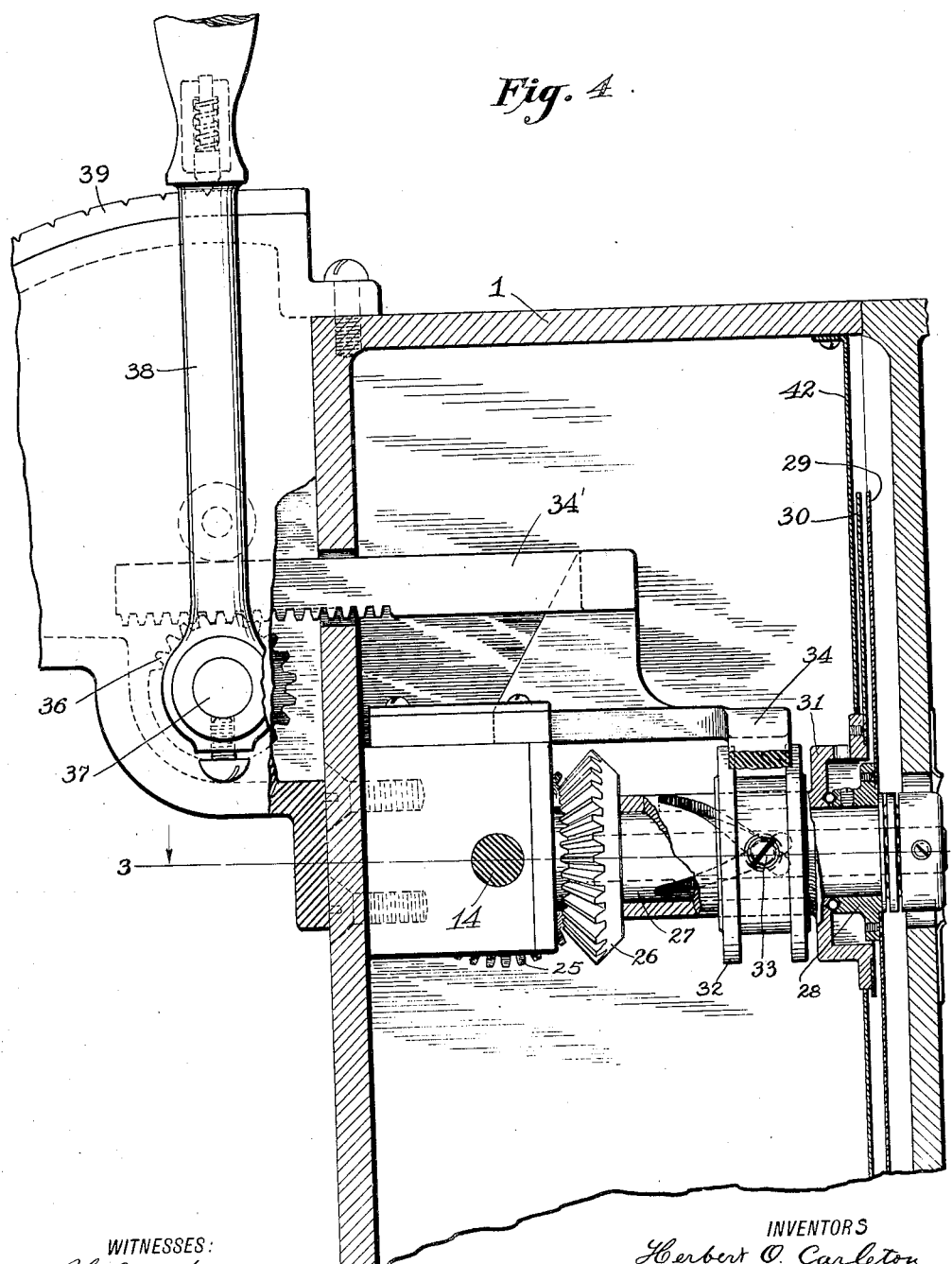

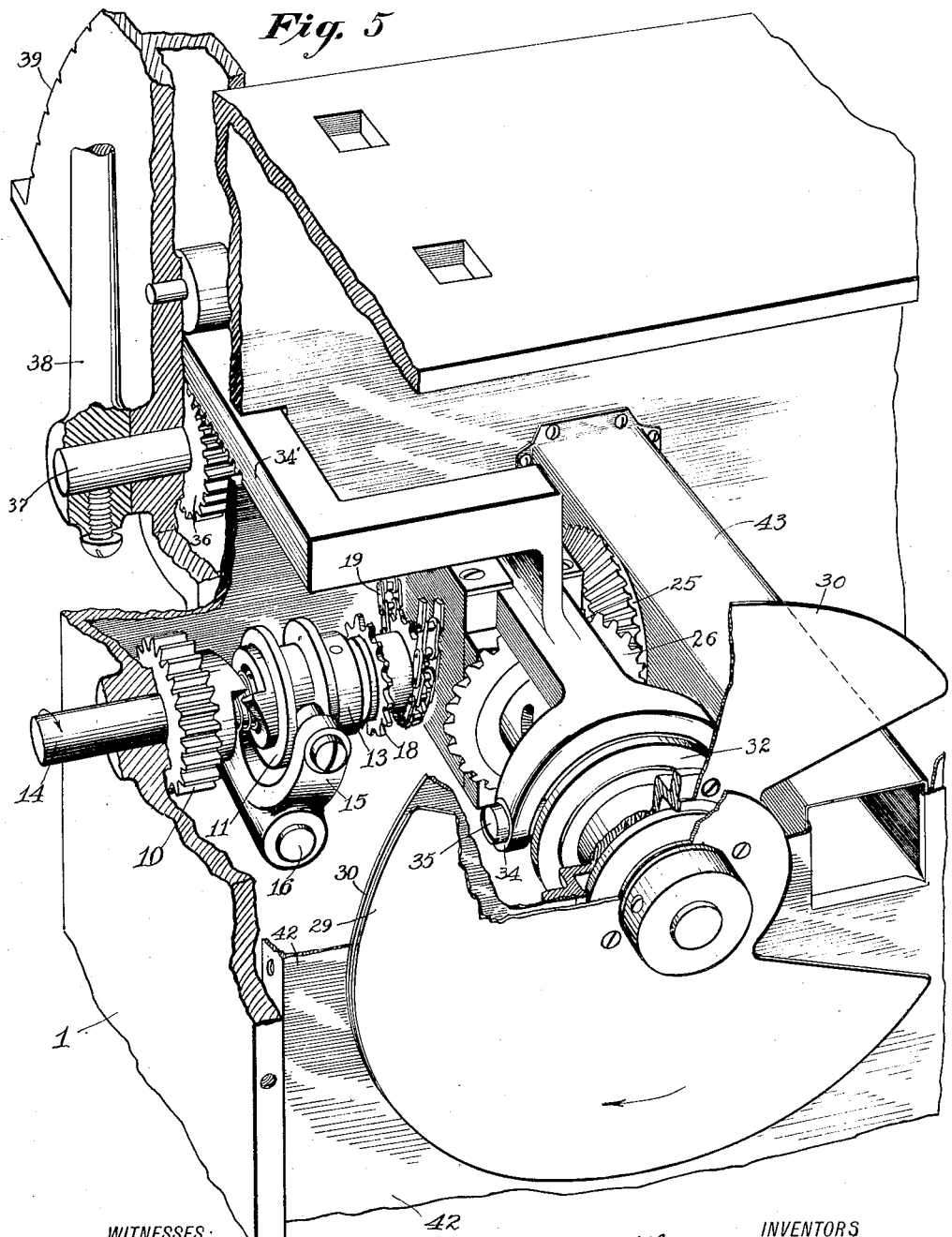

UNITED STATES PATENT OFFICE.

HERBERT O. CARLETON, OF NEW YORK, AND ERIK W. NELSON, OF NEW ROCHELLE, NEW YORK.

APPARATUS FOR PRINTING POSITIVE MOTION-PICTURE FILMS.

1,152,599.         Specification of Letters Patent.      Patented Sept. 7, 1915.

Application filed October 23, 1913. Serial No. 796,881.

*To all whom it may concern:*

Be it known that we, HERBERT O. CARLETON, a citizen of the United States, and resident of the city of New York, borough of Brooklyn, county of Kings, and State of New York, and ERIK W. NELSON, a citizen of the United States, and resident of New Rochelle, Westchester county, and State of New York, have invented certain new and useful Improvements in Apparatus for Printing Positive Motion-Picture Films, of which the following is a specification.

This invention relates to motion picture machines and more particularly to a machine for making the positive film from which the picture is projected.

The object of the invention is to provide a machine of the class described which shall be simple in construction and positive in its operation and with which the pictures taken on the negative film may be reproduced on the positive film with the greatest possible accuracy and efficiency.

In carrying out the invention we provide a machine in which two positive films may be made simultaneously, the two sets of positive and negative films being operated side by side from the same operating mechanism.

Certain features of construction, such as the adjustable shutter and feeding mechanism, as well as other features of the invention, will appear more fully hereinafter in connection with the description of the machine shown in the accompanying drawings as an illustration of one of the embodiments of the invention.

In the drawings like parts in the several views have been given the same reference numerals.

Figure 2:
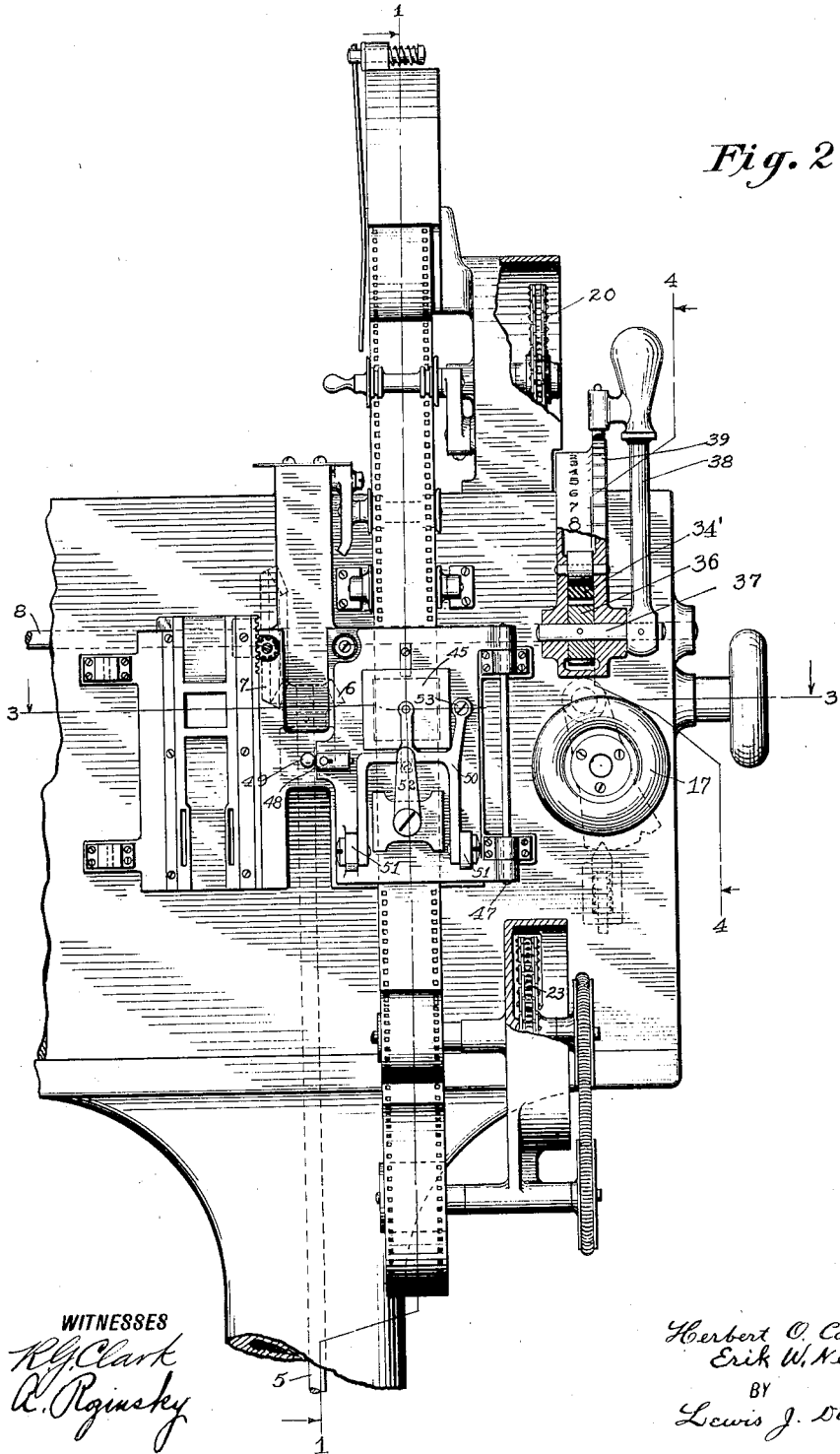

Figure 1 is a sectional side elevation of the machine, taken on the line 1—1 of Fig. 2. Fig. 2 is an enlarged front elevation of Fig. 1, partly broken away. Fig. 3 is an enlarged sectional plan view on the line 3—3 of Fig. 1. (Also of Figs. 2 and 4.) Fig. 4 is an enlarged sectional side view of a portion of Fig. 2, taken on the line 4—4. Fig. 5 is a perspective view taken from a point in front of the upper left hand corner of Fig. 3 or the upper right hand corner of Fig. 4.

A frame or housing is shown at 1 in which the operating mechanism is mounted. An electric motor 2 drives the worm 3 and its gear 4 which rotates the vertical shaft 5. At the upper end of the vertical shaft 5 a bevel gear 6 drives a bevel gear 7 attached to the horizontal shaft 8.

The film operating mechanism is duplicated on the two sides of the machine but for the purposes of illustration one set only of this mechanism is shown and described herein. It will be understood that these are both driven from the shaft 8, and either set may be disconnected.

At one end of the shaft 8 a gear 9 is mounted, shown in Fig. 1, which gear meshes with and drives a clutch gear 10, shown in Figs. 3 and 5. The gear 10 is provided on one face with a clutch adapted to be engaged by the clutch member 11, which is operatively connected by means of the pins 12 to a collar 13 attached to the shaft 14. The gear 10 is mounted to rotate upon the shaft 14 and the clutch member 11 is slidably mounted upon this same shaft. The pins 12 carried by the collar 13 extend into the clutch member 11, which is moved into and out of its operative position by means of the yoke 15 mounted on the shaft 16 and turned by means of the handle 17.

A double sprocket 18 is mounted upon the shaft 14, one portion of which drives the chain 19 and sprocket 20, (see Figs. 1 and 2), which, in turn, rotates the spur wheel 21 by means of which the positive and negative films are fed simultaneously from the rolls F and F'.

The opposite side of the sprocket 18 drives a chain 22 which, in turn, drives the sprocket 23 and spur wheel 24 for feeding the films to the lower rolls, which are rotated by means of a suitable belt and pulley arrangement from the shaft driven by the sprocket 23, shown in Figs. 1 and 2.

Referring to Fig. 3, a beveled gear 25 mounted on the shaft 14 rotates the beveled gear 26, which is provided with a long sleeve or extension 27 upon which a hub or collar 28 is mounted and to which one of the shutters 29 is attached and rotated thereby. A second portion of the shutter 30 is mounted upon a hub or sleeve 31 and both portions of the shutter are rotated by means of the collar 32 and the pins 33 attached thereto and which project through slots in the sleeves 31 and 27. (See Figs. 3, 4 and 5).

A sliding yoke 34 extends on either side of the collar 32 and the pins 35 are mounted thereupon which carry rollers 36 in an annular recess in the collar 32, by means of which the collar 32 is moved longitudinally upon the sleeve 31. (See Figs. 4 and 5.)

A gear 36 mounted on the shaft 37 is operated by the handle lever 38, which is provided with a suitable locating attachment operating in notches in the segment 39. The gear 36 engages with a rack on an extension 34' from the yoke 34, by means of which the yoke is moved longitudinally. The longitudinal movement of the yoke 34 moves the collar 32 carrying the pins 33 which project into the slots in the sleeves 27 and 31. (See Figs. 3 and 4). These slots extend at different angles curving around the axis of the sleeves, as shown in Fig. 4, and the longitudinal movement of the pins 33 in these slots rotates the sleeves 27 and 31 carrying the shutters 29 and 30 in opposite directions, thus regulating the amount of opening and time of exposure to the light.

Any suitable source of light, such as the electric incandescent bulb 40, is positioned in the light box 41 upon the rear of the casing 1. A light shield 42 in the casing 1 protects the film from the light except at the point where it is desired to expose the same. For this purpose a light tube 43, shown in Fig. 3, permits the light to pass from the bulb 40 to the opposite side of the machine as the open portions of the shutter pass between it and the light. At the side of the machine opposite the bulb 40 and the light tube 43 a film guide 44 is mounted and is provided with an opening corresponding to the size of the pictures. This opening is covered on the outside by a suitably colored glass 45, the films passing between the guide 44 and the glass 45. The glass 45 is carried in a hinged frame 46, which is hinged to the casing 1 at 47, as shown in Fig. 3, and is provided with a latch 48 engaging the latch post 49 at its opposite side. A hinged member 50, hinged at 51, is provided with a projecting pin which holds the glass 45 against the films. A spring 52, shown in Figs. 1 and 2, normally holds the glass 45 against the films, pressing the same tightly together between the glass and guide 44 while the exposure is taking place. This insures a sharp reproduction of the picture.

An adjustable screw 53 is engaged by a pin 54 carried by a cam frame 55 which, in turn, is operated by the cam 56 mounted on and rotated by the shaft 14. This cam is positioned so that the cam frame 55 and pin 54 are moved outwardly at the time the films are moved from one picture to the next. This outward movement swings the frame 50 outwardly and releases the pressure of the glass 45 against the films and thus allows the same to be readily drawn forward.

A pair of fingers 57 are mounted upon an extension of the cam frame 55 and are positioned to engage the series of openings in either side of the films and, as the cam 56 is rotated, the outward movement of the frame 55 causes these fingers 57 to engage the films and the further movement of the cam 56 causes a downward movement of the cam frame 55 and the fingers 57 which advances the films for the next picture. The construction of this cam mechanism is set out more fully in our co-pending application, filed contemporaneously herewith under Serial No. 796,882.

As many changes could be made in the above construction and many apparently widely different embodiments of our invention designed without departing from the scope of the appended claim, we intend that all matter contained in the above description or shown in the accompanying drawings shall be interpreted as illustrative merely of an operative embodiment of our invention and not in a limiting sense.

What we claim is:—

Means for making positive motion picture films including in combination a source of power, a vertical drive shaft operated thereby, a horizontal shaft being operatively connected with said vertical drive shaft, a double sprocket on said horizontal shaft, upper and lower positive and negative film rolls, means for connecting said upper and lower rolls with said double sprocket to rotate said rolls in unison, a source of light, means for confining said light to the successive pictures upon the films advanced, a movable glass, means for pressing said films upon said glass at predetermined intervals and means for effecting registration of said films with said glass and said light at predetermined times, as and for the purpose set forth.

Signed at New York city, in the county and State of New York, this 18th day of October, 1913.

HERBERT O. CARLETON.
ERIK W. NELSON.

Witnesses:
Lewis J. Doolittle,
Luella F. Little.